(12) United States Patent
Tajima et al.

(10) Patent No.: US 8,678,662 B2
(45) Date of Patent: Mar. 25, 2014

(54) DRIVE WHEEL BEARING DEVICE

(75) Inventors: Eiji Tajima, Shizuoka-Ken (JP); Hisashi Ohtsuki, Shizuoka-Ken (JP); Akira Torii, Shizuoka-Ken (JP); Motoharu Niki, Shizuoka-Ken (JP)

(73) Assignee: NTN Corporation, Osaka-Fu (JP)

( * ) Notice: Subject to any disclaimer, the term of this patent is extended or adjusted under 35 U.S.C. 154(b) by 0 days.

(21) Appl. No.: 13/563,340

(22) Filed: Jul. 31, 2012

(65) Prior Publication Data
US 2012/0295719 A1 Nov. 22, 2012

Related U.S. Application Data

(60) Division of application No. 12/945,092, filed on Nov. 12, 2010, now Pat. No. 8,261,447, which is a continuation of application No. 10/472,540, filed as application No. PCT/JP02/02831 on Mar. 25, 2002, now abandoned.

(30) Foreign Application Priority Data

| Mar. 29, 2001 | (JP) | 2001-96027 |
| Mar. 29, 2001 | (JP) | 2001-96036 |
| May 9, 2001 | (JP) | 2001-138861 |

(51) Int. Cl.
*F16C 43/00* (2006.01)

(52) U.S. Cl.
USPC .......................... 384/537; 384/589; 384/544

(58) Field of Classification Search
USPC ................... 29/894, 36, 361, 362, 505, 513; 384/537, 625, 544, 598, 585
See application file for complete search history.

(56) References Cited

U.S. PATENT DOCUMENTS 6,851,866 B2 * 2/2005 Kayama et al. .............. 384/584

* cited by examiner

*Primary Examiner* — David M Fenstermacher
*Assistant Examiner* — Terence Boes
(74) *Attorney, Agent, or Firm* — J. C. Patents

(57) ABSTRACT

A drive wheel bearing device is provided with an outer member, an inner member, double-row rolling elements and a constant velocity joint. The inner member includes double-row inner races opposite outer races of the outer member, a first inner member, and a second inner member formed with at least one of the double-row inner races, the first inner member and the second inner member being inseparably coupled together at a flange-like swaged portion. The constant velocity joint includes an outer joint member press-fitted to an inner periphery of the first inner member with torque transmission means formed therebetween that transmits torque by engagement of a plurality of axially extending teeth, wherein the torque transmitting teeth of the first inner member have a tooth profile that is controlled within a specified range over the entire axial length of the teeth.

7 Claims, 13 Drawing Sheets

DRIVE WHEEL BEARING DEVICE

CROSS-REFERENCE TO RELATED APPLICATION

This application is a divisional of and claims the priority benefit of U.S. application Ser. No. 12/945,092, filed on Nov. 12, 2010 which is now allowed and is a continuation of and claims the priority benefit of U.S. application Ser. No. 10/472,540, filed on Feb. 12, 2004, now abandoned. The prior U.S. application Ser. No. 10/472,540 is a 371 of international application of PCT application serial no. PCT/JP2002/002831, filed on Mar. 25, 2002, which claims the priority benefit of Japan Application No. 2001-96027, and No. 2001-96036, filed on Mar. 29, 2001 and No. 2001-138861, filed on May 9, 2001, in the Japan Industrial Property Office, the disclosures of all of which are incorporated herein by reference.

BACKGROUND OF THE INVENTION

The present invention relates to a bearing device for supporting a drive wheel of a vehicle such as an automobile (rear wheels of FR cars, front wheels of FF cars, and all wheels of 4WD cars), such as to be rotatable relative to a vehicle body.

There are various types of drive wheel bearing devices for automobiles in accordance with their applications. The drive wheel bearing device shown in FIG. 12, for example, is constructed with a bearing unit 1 consisting of a wheel hub 3 and a double-row bearing; an outer joint member 7a of a constant velocity joint 7 is fitted to the inner periphery of the wheel hub 3 such that torque is transmitted.

The bearing unit 1 includes double-row outer races 1a and inner races 2a, 2b, and double-row rolling elements 5 each interposed between the outer races 1a and the inner races 2a, 2b. In the illustrated example of the bearing device, one inner race 2b of the double-row inner races is formed directly on the outer periphery of the wheel hub 3, while the other inner race 2a is formed on the outer periphery of the inner ring 4 that is fitted to one end of the wheel hub 3. A nut 9 is screwed on the shaft end of the outer joint member 7a; tightening this nut 9 causes the back face 4a of the inner ring 4 to abut on the shoulder 7a1 of the outer joint member 7a for the positioning of the inner ring 4 and for the application of certain preload to the bearing.

In another construction that has been taught recently, swaging replaces tightening of the nut 9 for uniting the wheel hub 3 and the inner ring 4 and for providing preload to the bearing, so as to achieve a decrease in the size in the axial direction and weight of the bearing device. In this device, the inner ring 4 is fitted onto the wheel hub 3, and one end of the wheel hub 3 protruding from the inner ring 4 is swaged radially outward by plastic deformation as shown in FIG. 13, the positioning of the inner ring 4 and the application of preload being achieved by engagement of the swaged portion 3a and the back face 4a of the inner ring 4. The bearing device thus assembled (shown in FIG. 14) has a so-called "self-retaining" structure that enables assembly and disassembly of the bearing unit 1 and the constant velocity joint 7 while the bearing internal clearance of a preset controlled value is maintained; the structure is advantageous in that the nut 9 need not be tightened with a large torque to give preload to the bearing unit 1 but to the extent that there is no play in the mating parts of the wheel hub 3 and the outer joint member 7a.

Incidentally, in the drive wheel of a vehicle, in general, the center of a king pin must match the joint center O' of the constant velocity joint 7 so as to ensure good driving stability of the vehicle. However, in the construction wherein one end of the wheel hub 3 is swaged as noted above, there are inevitable variations in the axial position of the end face of the swaged portion 3a, which causes variations in the position of the joint center O' that is determined when the end face of the swaged portion 3a is abutted on the shoulder 7a1 of the outer joint member 7a, as a result of which it is made difficult to match it with the king pin center.

Further, when forming the flange-like swaged portion 3a, there are cases where serrations 8a formed on the inner periphery of the wheel hub 3 bulge inward at the end on the side of the swaged portion 3a due to plastic material flow during the swaging, causing a decrease in the diameter as indicated by the solid line in FIG. 15. Such decreased diameter will make it necessary to apply a much larger force than usual when press-fitting the serrated shaft 8b (see FIG. 14) of the outer joint member 7a into the inner periphery of the wheel hub 3, deteriorating the operation efficiency, and in a worst case the press-fitting itself may be made impossible.

As a countermeasure of this problem, as shown in FIG. 16, the portion of the inner periphery of the wheel hub 3 before the broaching that is expected to decrease in diameter may be given a larger inside diameter $\Phi d_2$ than the diameter $\Phi d_1$ of other portions to allow for the decrease, and after broaching both the small diameter part of the inside diameter $\Phi d_1$ and the large diameter part of the inside diameter $\Phi d_2$ to form the serrations 8a (as indicated by the broken line), the end part 3b of the wheel hub 3 may be swaged radially outward.

With this method, however, because there are large variations in the decrease in diameter during the swaging depending on the swaging conditions, the inside diameter $\Phi d_2$ of the large diameter part must at least be closely controlled, which will raise the manufacturing cost.

Another possible measure would be to cut the portion X' of the inner periphery of the wheel hub 3 that is expected to decrease in diameter after the swaging as shown in FIG. 17, and to form this portion as a cylindrical surface without the broaching; this would make the effective axial length of the serrations 8a shorter and could possibly lead to insufficient torque transmission to and from the constant velocity joint 7.

Prior art has shown that the thrust face of the swaged portion 3a of the wheel hub 3 that abuts on the outer joint member 7a may be formed as a flat surface by a coining or turning process (Japanese Patent Laid-Open Publication No. Hei 11-5404), but the end face of the swaged portion 3a could only be flattened to a limited degree, and even slightest undulation may create a small gap between the thrust face and the abutting shoulder 7a1 of the outer joint member 7a. The bearing takes large moment load during cornering, which may well cause resilient deformation of the bearing, whereupon the gap between the abutting faces may be widened due to the self-retaining structure that can lessen the tightening force of the nut 9, resulting in troubles such as penetration of dust or rain water through this gap. Dust or rain water penetrated into the mating parts of the wheel hub 3 and the serrated shaft 8b will cause formation of rust, which not only accelerates wear of the mating parts but causes them to stick; a large number of process steps will thereby be required for the disassembly, which is not desirable.

Another construction has been known (Japanese Patent Laid-Open Publication No. 2000-142009), in which the serrated shaft 8b of the outer joint member 7a and the wheel hub 3 are coupled together in a detachable manner using a retention ring, and in which the radial gap between the wheel hub 3 and the serrated shaft 8b is sealed by a sealing member; however, the gap between the aforementioned abutting faces is much larger than that in the nut tightening structure shown in FIG. 14 whereby a solid sealing member is required, resulting in higher costs and lower rigidity of the entire device, which is not desirable.

The present invention has been devised under these circumstances, its object being to achieve the following:

1) To prevent offsetting between the king pin center and the joint center of the constant velocity joint;

2) To prevent adverse effects of radial contraction of serrations and others caused by swaging without decreasing the axial effective length of the serrations and at low cost; and 3) To prevent rust in mating parts of the wheel hub and the serrated shaft to avoid deterioration of disassembling operation efficiency.

SUMMARY OF THE INVENTION

To achieve the above objects, the present invention provides a drive wheel bearing device to which the present invention is applied includes: an outer member having double-row outer races on an inner periphery thereof; an inner member including double-row inner races opposite the outer races of the outer member, a first inner member, and a second inner member formed with at least one of the double-row inner races, the first inner member and the second inner member being inseparably coupled together at a flange-like swaged portion that is formed by a radially outward plastic deformation of one end of the first inner member; double-row rolling elements interposed between the outer member and the inner member; and a constant velocity joint including an outer joint member press-fitted to an inner periphery of the first inner member with torque transmission means formed therebetween that transmits torque by engagement of a plurality of axially extending teeth. The torque transmitting teeth of the first inner member have a tooth profile that is controlled within a specified range over the entire axial length of the teeth.

In this wheel bearing device, when swaging one end of the first inner member, the torque transmitting teeth of the first inner member may deform radially inward on the side of the swaged portion due to the plastic material flow as noted above. When this phenomenon occurs, in most cases, the torque transmitting teeth decrease in diameter (particularly in its small diameter part), or the flank of the teeth bulges out. No measure is taken to adjust such deformed parts to predetermined dimensions in prior art, because of which there are often variations in the tooth profile between one axial end and the other of the torque transmitting teeth.

According to the invention, however, the torque transmitting teeth of the first inner member have a tooth profile that is controlled within a specified range over the entire axial length of the teeth. That is, while the tooth profile of the torque transmitting teeth was left as it is after the swaging in the prior art irrespective of the presence of the above mentioned deformation, the tooth profile is positively processed so that it falls within the specified range after the deformation. Deformation (or protrusion) of the torque transmitting teeth near the swaged portion is thereby suppressed, so that it is prevented that an excessively increased force is required when press-fitting the outer joint member into the first inner joint member.

In view of the above, the "specified range" for the tooth profile is determined in accordance with a maximum permissible force required for press-fitting the outer joint member into the first inner member. In other words, the limits of the range are determined in accordance with the maximum permissible press-fitting force, and the tooth profile of the torque transmitting teeth is controlled to be within this specified range. If the maximum permissible press-fitting force is relatively large in the production line, for example, the limits are set to cover a wide range, and in a converse case, the limits are set to cover a narrow range. Taking account of the general maximum permissible press-fitting force in the production line, this range should preferably be determined such that the torque transmitting teeth have an over pin diameter with a dimensional tolerance of 60 μm.

The "over pin diameter" (O.P.D.) is also referred to as a ball pitch diameter (B.P.D.) or an over ball diameter (O.B.D.), and defined as a distance M between two pins 62 (or balls) when they fit in the two opposite tooth spaces 81c, as shown in FIG. 5 (specified in JIS B 1602).

In concrete terms, the tooth profile control can be achieved, for example, by a process including primary turning of the first inner member on the inner periphery, swaging of one end of the first inner member, secondary turning of the first inner member on the inner periphery in a region including at least the vicinity of the swaged portion, and broaching of the inner periphery of the first inner member.

Alternatively, it may be achieved by a process including primary turning and broaching of the first inner member on the inner periphery, swaging of one end of the first inner member, and secondary turning of the first inner member in a region including at least the vicinity of the swaged portion.

In either of the above control processes, the torque transmitting teeth of the first inner member include a surface that has undergone secondary turning at least in the vicinity of the swaged portion (particularly in the small diameter part). At least this vicinity of the swaged portion that has undergone secondary turning may have a larger diameter than other portions.

In the above drive wheel bearing device, a negative clearance may be provided between the rolling elements, and the inner races and the outer races in which the rolling elements roll, whereby preload is applied to the bearing part and the rigidity and life of the bearing can be increased.

Further, a pilot part may be provided at an inner periphery near the swaged portion of the first inner member so as to make the gap between the inner periphery and the opposite outer periphery of the outer joint member smaller, whereby deformation of the end part of the first inner member due to the load applied in the direction of contact angle is suppressed, and life of the bearing device can be improved.

A drive wheel bearing device for supporting a wheel such as to be rotatable relative to a vehicle body according to the present invention includes: an outer member formed with double-row outer races on an inner periphery thereof; an inner member including double-row inner races opposite the outer races of the outer member and a flange for attachment of a wheel both formed on an outer periphery thereof, and a swaged portion that is formed by a radially outward plastic deformation of one end thereof; double-row rolling elements interposed between respective races of the outer member and the inner member; and a constant velocity joint including an outer joint member abutted on the swaged portion of the inner member, the outer joint member having a stem part-fitted into the inner member such as to transmit torque via torque transmission means, wherein mating parts of the inner member and the outer joint member are subjected to rust proof treatment. Thereby, formation of rust in the mating parts of the inner member and outer joint member is suppressed even if dust or rain water has penetrated, and the disassembling operation efficiency can be improved.

The rust proof treatment may include, for example, providing an antirust in the mating parts of the inner member and the outer joint member, to suppress rust generation on the surface of the mating parts. The gaps in the mating parts may also be filled with the antirust, so as to remove the play in the mating parts, and to prevent the penetration itself of dust or rain water into the mating parts for better rust prevention effects.

The antirust may be an adhesive containing an elastomer or a foaming agent containing an elastomer, to achieve rust prevention effects reliably with an easy operation.

The outer member may have the double-row outer races on the inner periphery thereof and a flange for attachment to the vehicle body on an outer periphery thereof, both being formed integrally therewith.

The inner member may include a wheel hub having a flange for attachment of a wheel on an outer periphery, an outboard side inner race, and a small diameter stepped part, and an inner ring fitted onto the small diameter stepped part of the wheel hub and including an inboard side inner race on an outer periphery thereof. In this case, one end of the small diameter stepped part is plastically deformed radially outward so as to unite the wheel hub and the inner ring.

The inner member and the stem part of the outer joint member may be fixed to each other in the axial direction in a detachable manner by a retention member so as to facilitate assembling and disassembling operations, whereby the operation efficiency is much improved.

The inner member may be provided with a cap fitted thereon to seal an opening at one end thereof, and the cap may have an aperture therein so as to suppress penetration of dust or rain water into the mating parts from the opening. Since the mating parts communicate to the outside air through the aperture, there is no risk that a rise in the internal pressure in the mating parts will deteriorate the operation efficiency when fitting the cap. Furthermore, surplus antirust provided to the mating parts can be discharged from this aperture.

DESCRIPTION OF EMBODIMENTS

Preferred embodiments of the present invention will be hereinafter described with reference to FIG. 1 to FIG. 11. "Outboard side" and "inboard side" in the following description refer to the outer side and inner side of the bearing device mounted on a vehicle, respectively. The left side is the outboard side and the right side is the inboard side in FIGS. 1, 3, 4, and 6 to 11.

Figure 1:
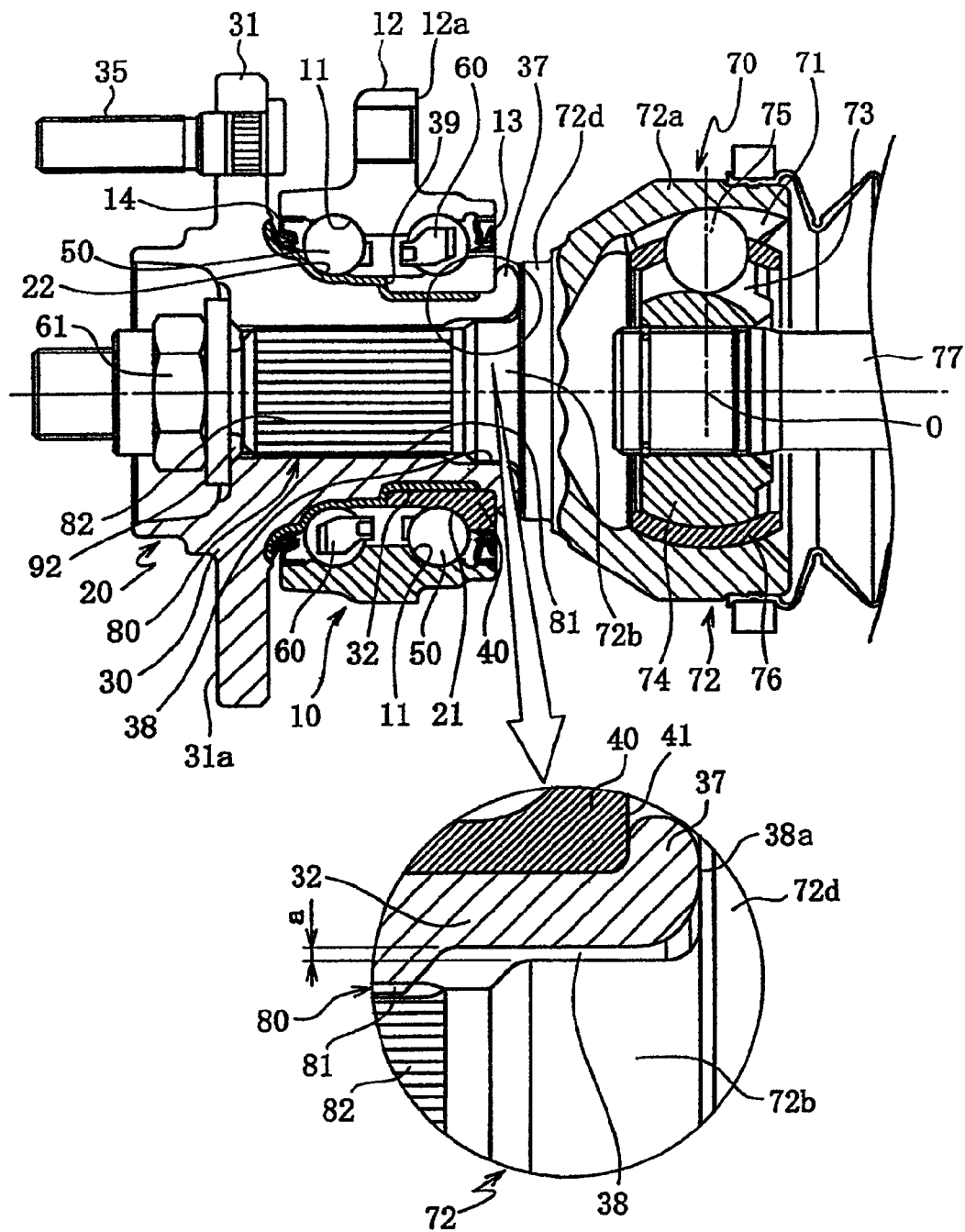
FIG. 1 is a cross-sectional view and an enlarged cross-sectional view of major parts of a drive wheel bearing device according to the invention.

FIG. 1 illustrates a drive wheel bearing device, which includes an outer member 10 fixed to the vehicle body, an inner member 20 driven to rotate, and double-row rolling elements 50 interposed between the outer member 20 and the inner member 10 for rotatably supporting the inner member 20. The double-row rolling elements 50 are held by a resin-made retainer 60 in circumferentially equally spaced relation in between double-row outer races 11 and inner races 21, 22 and roll on the respective races. While this embodiment shows by way of example a bearing in which the rolling elements 50 are balls, they may be tapered rollers.

The outer member 10 includes the double-row outer races 11 on the inner periphery thereof and an integrally formed flange 12 on the outside for attachment onto a mounting member such as a knuckle extending from a suspension system of the vehicle body. Seals 13, 14 are provided to either open end of the outer member 10 to seal the annular space between the outer member 10 and the inner member 20 and to prevent leakage of grease filled inside the bearing and penetration of water or foreign matter from outside.

The inner member 20 consists of a first inner member 30 and a second inner member 40 fitted to the outer periphery of the former. The inner member 20 of this embodiment is constructed, by way of example, with a wheel hub 30 as the first inner member and an annular inner ring 40 as the second inner member fitted onto the wheel hub 30. A flange 31 is integrally formed on the wheel hub 30 on the outer periphery on the outboard side for attachment of a wheel. A drive wheel, which is not shown, together with a brake rotor, is fastened to the flange 31 with hub bolts 35 in the flange 31.

A small-diameter cylindrical part 32 is formed on the outer periphery of the wheel hub 30 on the inboard side. The inner ring 40 is press-fitted onto the small-diameter cylindrical part 32. The inner race 21 on the inboard side is formed on the outer periphery of the inner ring 40, while the race 22 on the outboard side is formed directly on the outer periphery of the wheel hub 30. The wheel hub 30 has an axial bore in the center for attachment of an outer joint member 72 of a constant velocity joint 70, which will be described later.

The wheel hub 30 and the inner ring 40 are inseparably joined together by engagement between the end face 41 on the inboard side (back face) of the inner ring 40 and a swaged portion 37, which is formed by a radially outward plastic deformation of one end of the wheel hub 30 that protrudes from the inner ring 40. Axial positioning of the inner ring 40 relative to the wheel hub 30 is achieved by this swaged portion 37 and certain preload is given to the rolling elements 50. The plastic deformation can be achieved, for example, by an orbital forming. When performing the swaging, allowance should be made for clearance loss that may be caused by the deformation of the inner ring 40 so that the bearing internal clearance is controlled within a preset range. The initial bearing internal clearance thus secured will be well maintained through the assembling or disassembling process of the constant velocity joint 70 to be described later.

The bearing clearance is set to be a negative value. Thereby the preload is constantly applied to the bearing even when subjected to a moment load during cornering, and high bearing rigidity is maintained. Such negative clearance is also effective in preventing jarring of the flange surface 31a of the wheel hub 30, which is considered a cause of brake judder; operation stability and drive feeling can thus be improved.

Hatching for indicating a cross-sectional view is omitted in the upper half of FIG. 1, and instead, the hatching indicates the layers that have been surface hardened by heat treatment. The wheel hub 30 is formed of a carbon steel or the like containing carbon in an amount of 0.45 to 1.10 weight % by forging; the wheel hub 30 undergoes heat treatment in the hatched portion, i.e., the region including the vicinity of the base end of the flange 31 for attaching a wheel, the inner race 22 on the outboard side, the shoulder 39 that abuts on the inner ring 40, and the outer face of the part (small diameter cylindrical part 32) that mates with the inner ring 40, so as to have a surface hardened layer of about Hv 510 to 900.

The swaged portion 37 at the inboard-side end of the wheel hub 30 is left non-hardened so that it has sufficient ductility to enable the swaging. More specifically, it should have an Hv 200 to 300 hardness so as to retain sufficient ductility to enable the swaging.

For the quenching, any known techniques such as high frequency quenching, carburizing quenching, and laser quenching may be employed, but the high frequency quenching is most suitable for the heat treatment with a certain quenching pattern as described above. High frequency quenching is a case hardening treatment that uses induction heating whereby hardened layers are freely selectable to provide wear resistance and to improve higher fatigue strength. Because it allows free selection of case depth and does not cause serious thermal effects to other parts, the properties of the mother material are maintained; it is therefore particularly suitable for forming the above swaged portion 37, which needs to have a non-hardened part in the mother material.

Although not shown, the inner ring 40 undergoes similar quenching or hardening process on the entire surface. Alternatively, the inner ring 40 may be hardened to the interior by dip quenching.

The wheel bearing device includes the fixed type constant velocity joint 70 for transmitting the rotational drive force from the engine (not shown) at a certain operation angle. The constant velocity joint 70 transmits torque from an intermediate shaft 77 that forms part of the drive shaft to the outer joint member 72 through an inner joint member 74 and torque transmission balls 75. The outer joint member 72 includes a cup-shaped mouth part 72a closed at one end (outboard side) and opened at the other end (inboard side) and a shaft-like stem part 72b, and a plurality of track grooves 71 are formed in the axial direction on the inner periphery of the mouth part 72a. A plurality of ball tracks are formed by these track grooves 71 and a plurality of track grooves 73 provided on the outer periphery of the inner joint member 74; the constant velocity joint 70 is constituted by the torque transmission balls 75 arranged in these ball tracks. The torque transmission balls 75 are held by a cage 76 on a plane bisecting the two shafts.

Figure 2:
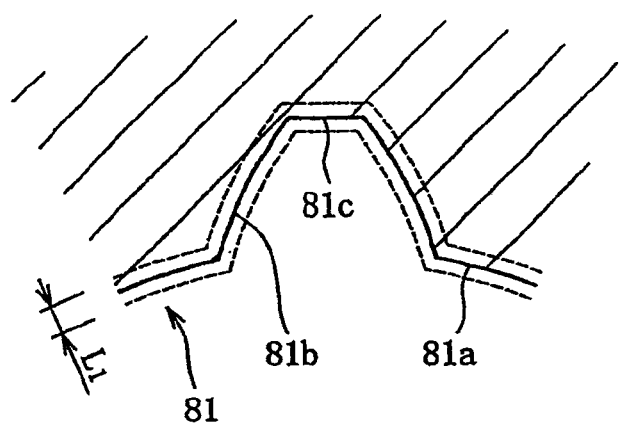
FIG. 2 is an enlarged cross-sectional view in a radial direction of serrations formed on the inner periphery of the wheel hub in the above drive wheel bearing device.

The stem part 72b of the outer joint member 72 is press-fitted into the aforementioned axial bore of the wheel hub 30. The wheel hub 30 and the outer joint member 72 are coupled together by engagement between their axially extending teeth, which constitute torque transmission means 80 so that torque is transmitted from one to another. The torque transmission means 80 is formed, for example, by torque transmitting teeth or serrations 81 formed on the inner periphery of the wheel hub 30 and a serrated shaft 82, which is part of the stem part 72b of the outer joint member 72 formed with teeth for transmitting torque. The flank 81b of the teeth of the serrations 81 and the serrated shaft 82 may take any form, e.g., a curved surface as shown in FIG. 2 (such as an involuted curve surface), or a flat surface (including a tapered surface). Although not shown, both the serrations 81 and the serrated shaft 82 have a surface hardened layer formed by heat treatment such as high frequency quenching or the like. The torque transmission means 80 may also be formed by splines and a spline shaft.

After the outer joint member 72 is press-fitted into the wheel hub 30, a nut 61 is screwed onto the shaft end of the stem part 72b and tightened to fix the constant velocity joint 70 to the wheel hub 30. Since preload control is already achieved by the swaged portion 37, the nut 61 need only be tightened to the extent of preventing separation of the constant velocity joint 70 from the wheel hub 30. Therefore, the tightening torque of the nut 61 is much reduced as compared to prior art in which large tightening torque was required to provide preload after the assembly. Tightening the nut 61 makes the end face of the swaged portion 37 on the inboard side abut on the shoulder 72d of the outer joint member 72. Instead of the tightening with the nut 61, the outer joint member 72 may be fixed to the wheel hub 30 in a detachable manner using other retention members 90 such as a clip or a snap ring (see FIG. 10 and FIG. 11).

Figure 10:
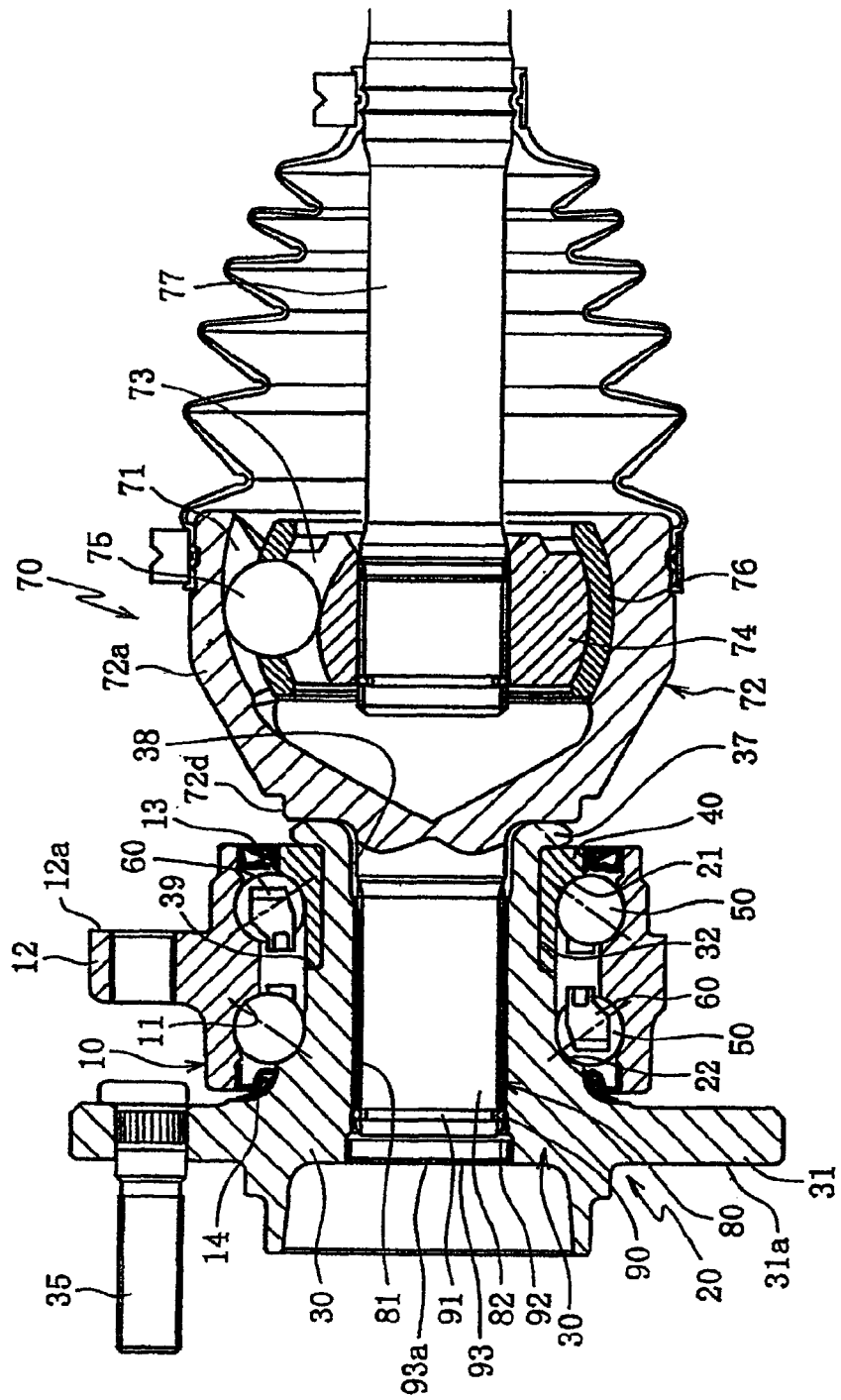
FIG. 10 is a longitudinal cross-sectional view of a drive wheel bearing device according to one embodiment of the invention.
Figure 11:
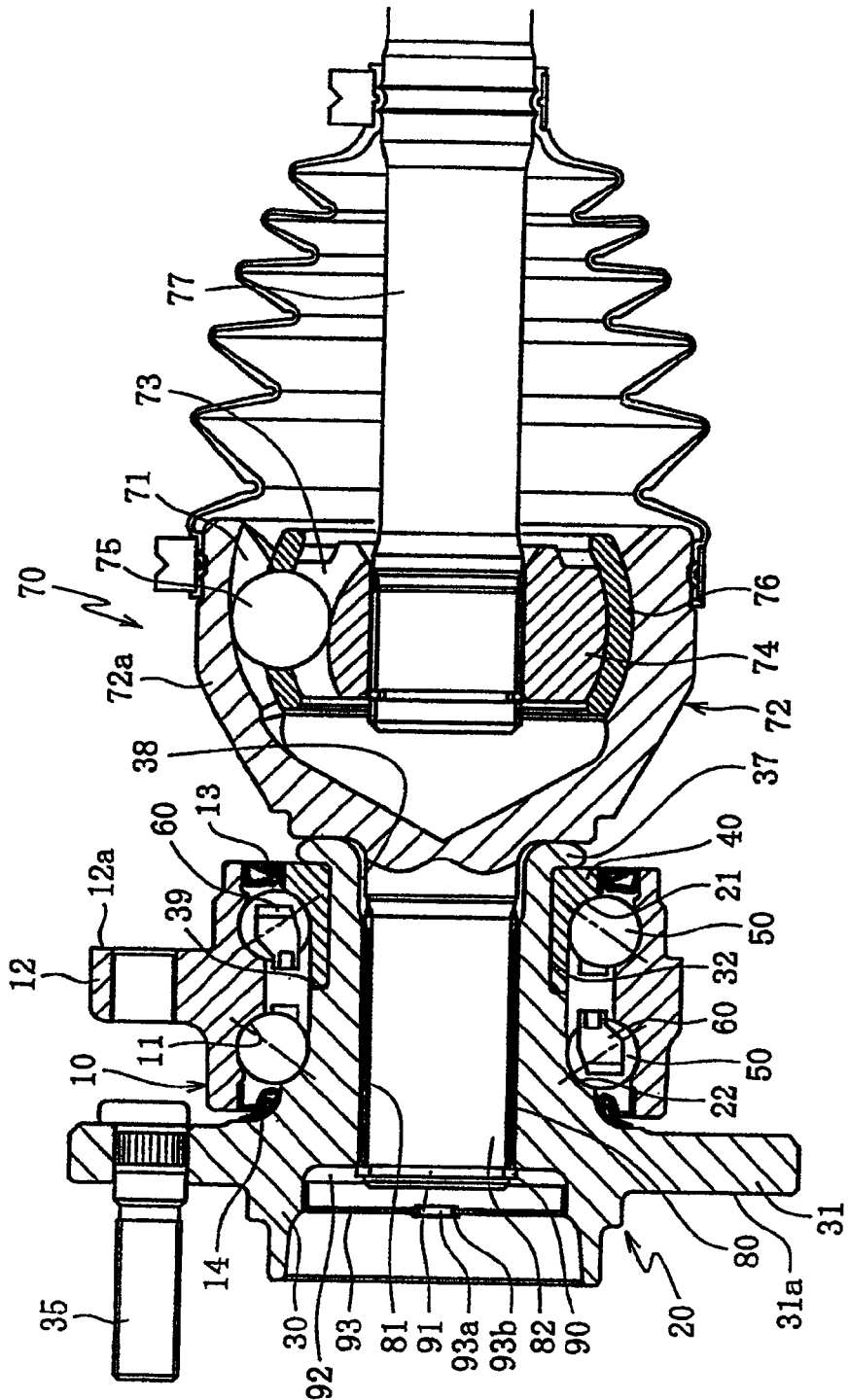
FIG. 11 is a longitudinal cross-sectional view of a drive wheel bearing device according to another embodiment of the invention.

In the bearing device that uses a double row angular contact ball bearing as in the illustrated example, the swaged portion 37 of the wheel hub 30 takes the load applied in the direction of the contact angle of the rolling elements 50 (indicated by dot-dash lines in FIG. 10 and FIG. 11). In order to prevent deformation of the small diameter cylindrical part 32 of the wheel hub 30 on the inboard side and the inner race 21 of the inner ring 40 that may be caused by this load, the wheel hub 30 includes a pilot part 38 formed on the inner periphery near the swaged portion 37, where the gap between the inner peripheral surface of the wheel hub 30 and the opposite outer peripheral surface of the stem part 72b of the outer joint member 72 is made smaller. The pilot part 38 is formed in the region containing the extension lines of the contact angle of the rolling elements 50 on the inboard side.

By providing such a pilot part 38, the outer periphery of the stem part 72b suppresses radially inward deformation of the small diameter cylindrical part 32 that may be caused by the load applied in the direction of the contact angle. Thereby, crack loss of the wheel hub 30 is prevented, fretting between the wheel hub 30 and the inner ring 40 is reduced, and deformation of the inner race 21 on the inner ring 40 is suppressed, leading to improved rolling life and suppression of temperature rise, which will result in longer life of the bearing device. To achieve these effects, the pilot gap between the pilot part 38 and the opposing outer periphery of the outer joint member 72 (the stem part 72b) as denoted at "a" in the enlarged view in FIG. 1 should preferably be 0.4 mm or less. The pilot gap "a" may be provided, for example, by carrying out secondary turning to the pilot part 38 to adjust its dimensions after the swaging of the end part of the wheel hub 30.

Figure 3:
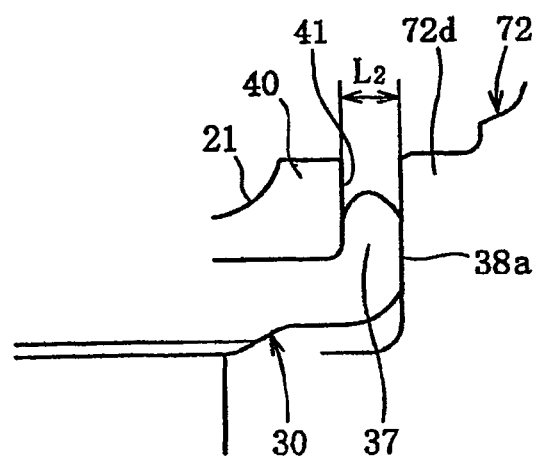
FIG. 3 is an enlarged cross-sectional view of major parts in FIG. 1.

As is shown in FIG. 3 to an enlarged scale, the end face of the swaged portion 37 on the inboard side includes a flat surface 38a extending orthogonally to the axial line. In the prior art wherein the swaged portion 3a is not processed after the swaging, the swaged portion 3a may make line contact with the shoulder 7a1 of the outer joint member 7a, whereby abnormal wear may occur in the swaged portion 3a or the shoulder 7a1 because of excessive surface pressure applied thereto. Thus, by forming part of the swaged portion 37 that abuts the shoulder 72d as a flat surface 38a as described above so that they make surface contact with each other, the contact surface pressure is reduced and abnormal wear in the abutting parts can be suppressed.

The flat surface 38a may be formed by a pressing process of the swaged portion 37, for example, but the pressure in the pressing process may cause the base end of the swaged portion 37 to extend inward due to material flow, whereby the insertion of the outer joint member 72 may be made difficult. Therefore, the flat surface 38a should preferably be formed on the end face of the swaged portion 37 by a machining process whereby material is removed such as turning or grinding.

Even with such a flat surface 38a formed on the swaged portion 37 as described above, variations in the axial position of the flat surface 38a may lead to variations in the relative positions of the constant velocity joint 70 and the wheel hub 30 in the axial direction because the swaged portion 37 is abutted on the outer joint member 72; such variations will make it difficult to ensure that the joint center 0 and the king pin center are matched. If the king pin center does not match the joint center O, the driving stability of the vehicle may be deteriorated. Further, if the flat surface 38a is not formed with a high degree of perpendicularity, dust may penetrate through the thrust part of the flat surface 38a that abuts the end face of the shoulder 72d, causing rust in the torque transmission part 80, which will make it difficult to remove the outer joint member 72 from the wheel hub 30 at the time of repair or the like.

To overcome these problems, according to the invention, the variations in the axial position of the flat surface 38a are controlled to be within a specified limit. Thereby, offsetting between the joint center O and the king pin center is suppressed to a minimum, or they are perfectly matched, whereby the driving stability of the vehicle is enhanced, and deterioration of the sealing properties in the abutting portion of the flat surface 38a is prevented.

The specified limit is determined by the variations in the thickness $L_2$ in the axial direction of the swaged portion 37, or the variations in the distance in the axial direction between the flat surface 38a and the end face 41 on the inboard side of the inner ring 40, as shown in FIG. 3; these variations are controlled to be ±0.2 mm in this invention. The flat surface 38a can be formed precisely within the specified limits by a machining process; the machining may be performed using, for example, the end face 31a (or flange surface) on the outboard side of the flange 31 for attachment of a wheel or the end face 12a on the inboard side of the flange 12 for attachment to the vehicle body, as a reference surface. Both are formed with high precision, the former for ensuring a high degree of precision in the mounting of the brake rotor and the latter for ensuring a high degree of precision in the mounting of the knuckle, and therefore are suitable as a reference surface, and the thickness $L_2$ can readily be controlled within the above specified limits by the machining process based on these reference surfaces.

The degree of perpendicularity is defined as follows: When taking one of the axial line and the flat surface 38a, which must be orthogonal to each other, as a reference line or a reference surface, assume a geometrical plane or a line orthogonal to the reference line or the reference surface. The degree is defined as a geometrical deviation between the geometrical plane or the line, and the other of the axial line and the flat surface 38a. The degree of perpendicularity between the flat surface 38a and the axial line is controlled to be within 0.15 mm in this invention, whereby the sealing properties in the part of the swaged portion 37 that abuts the shoulder 72d are further improved.

The degree of perpendicularity between the flat surface 38a and the axial line can also be controlled indirectly by securing a parallelism between the end face 31a on the outboard side of the flange 31 for attachment of the wheel and the flat surface 38a.

Figure 12:
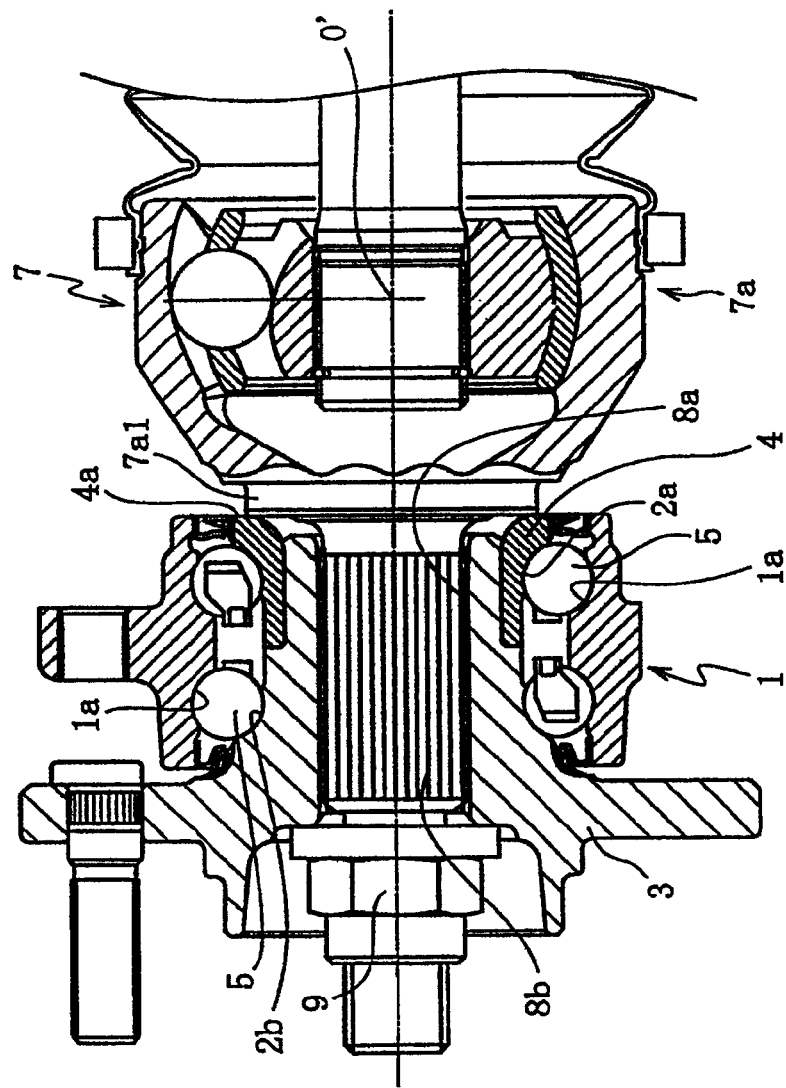
FIG. 12 is a cross-sectional view of a prior art drive wheel bearing device.
Figure 13:
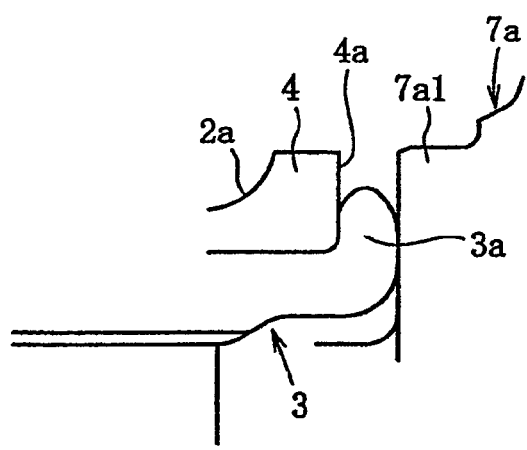
FIG. 13 is an enlarged cross-sectional view of a drive wheel bearing device that achieves positioning of the inner ring and application of preload by swaging.
Figure 14:
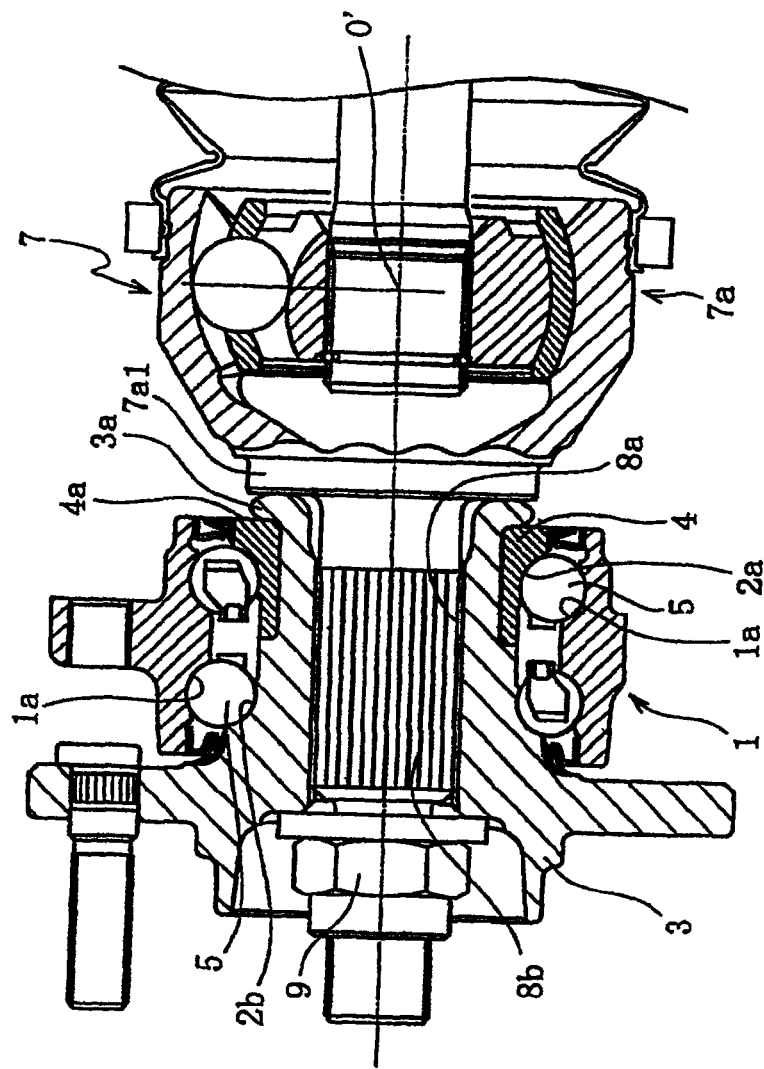
FIG. 14 is a cross-sectional view illustrating the overall construction of a drive wheel bearing device that achieves positioning of the inner ring and application of preload by swaging.
Figure 15:
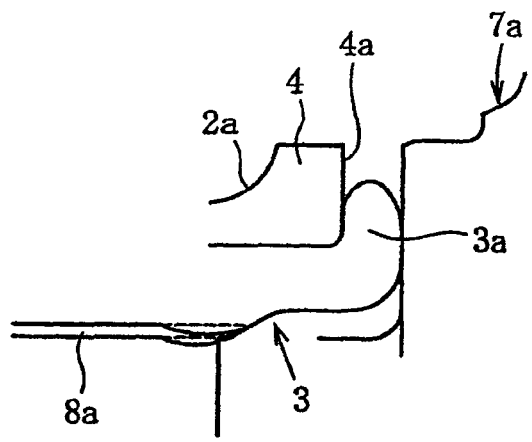
FIG. 15 is an enlarged cross-sectional view illustrating a structure for fixing the inner ring by swaging.
Figure 16:
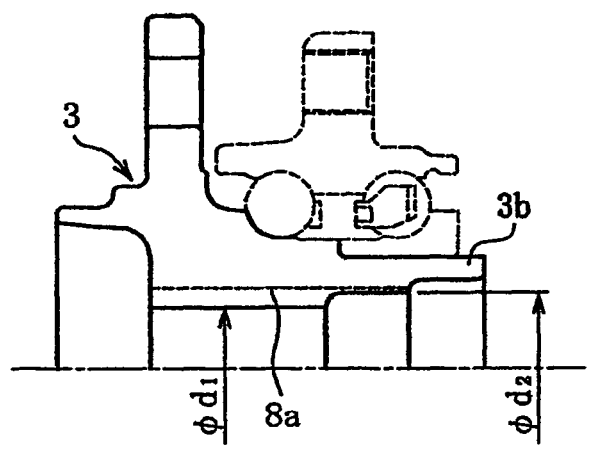
FIG. 16 is a cross-sectional view of a wheel hub illustrating a prior art countermeasure against radial contraction.
Figure 17:
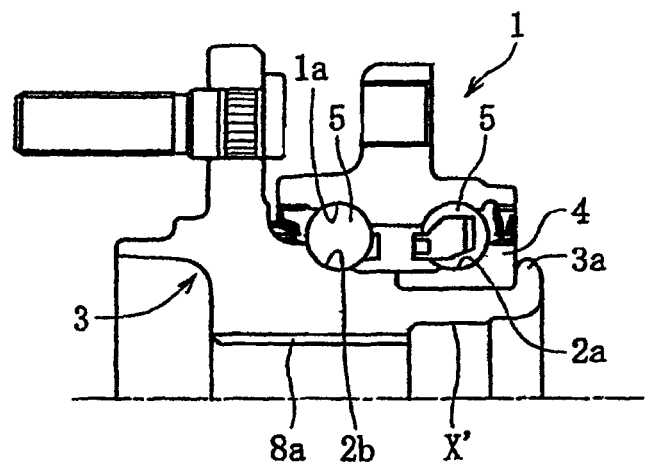
FIG. 17 is a cross-sectional view of a drive wheel bearing device illustrating another prior art countermeasure.
Figure 18:
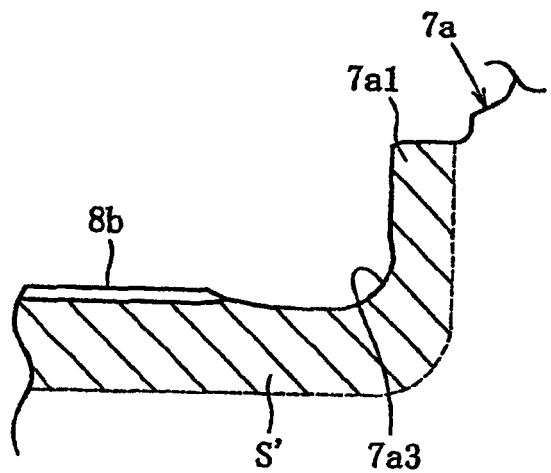
FIG. 18 is an enlarged cross-sectional view of major parts of a prior art drive wheel bearing device.

In the prior art shown in FIG. 12, the outer joint member 7 includes a continuous surface hardened layer S' on the outer periphery in the area covering the convex serrated shaft 8b, which forms the torque transmission means, a recess 7a3, and the shoulder 7a1, as indicated by the hatching in FIG. 18. The serrated shaft 8b is hardened so as to have sufficient strength for transmitting torque to and from the wheel hub 3. The shoulder 7a1 is hardened because the inner ring 4 undergoes case hardening treatment. That is, if the shoulder 7a1 is not hardened while the inner ring 4 undergoes case hardening treatment, the difference in the hardness between the inner ring 4 and the shoulder 7a1 will be too large; thus the shoulder 7a1 needs to be hardened so as to prevent fretting wear and deterioration of sealing properties that may be caused by the large difference in the hardness.

Figure 4:
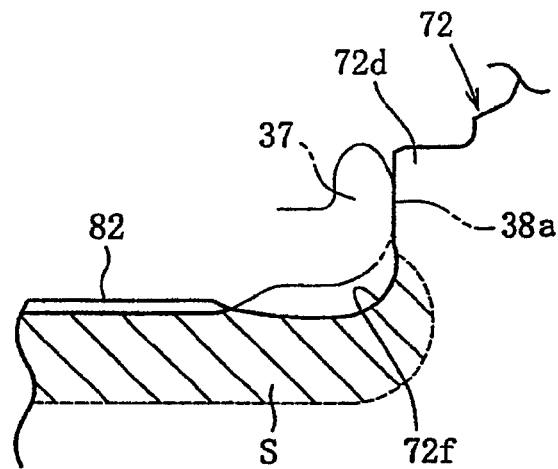
FIG. 4 is an enlarged cross-sectional view of major parts in FIG. 1.

On the other hand, if the shoulder 72d of the invention is surface hardened as with the prior art, then the above problem will arise due to a large difference in the hardness between the shoulder 72d and the swaged portion 37 abutted thereto, because the latter is not hardened. Therefore, in this invention, the shoulder 72d is not surface hardened by the heat treatment as shown in FIG. 4, so that it has approximately the same hardness as the swaged portion 37. That is, the outer joint member 72 has a surface hardened layer S in the area that only covers the serrated shaft 82 and the recess 72f as shown in FIG. 4, and the end face of the shoulder 72d, at least the portion abutting the swaged portion 37, is not hardened by the thermal effects. The surface hardened layer S of the outer joint member 72 should preferably be formed by high frequency quenching similarly to the hardened layer of the wheel hub 30.

The non-hardened swaged portion 37 and the shoulder 72d will have reduced rigidity; however, in the present invention, because preload is given to the bearing by the swaging as described above, the surface pressure applied to the abutting portion of these members is much smaller than that in the prior art shown in FIG. 12, and therefore such reduced rigidity will present no problems.

As mentioned above, when forming the swaged portion 37 by processing the end part of the wheel hub 30, the serrations 81 may sometimes deform radially inward near the swaged portion 37 (on the inboard-side end) due to plastic material flow. The deformation occurs as a phenomenon in which the serrations 81 protrude toward the serrated shaft 82 with which they engage; normally, the small diameter part 81a or large diameter part 81c of the serrations 81 decreases in diameter, or the flank 81b of the teeth bulges inward (all shown in FIG. 2) (This phenomenon is referred to as "radial contraction" in this specification).

In this invention, in order to deal with this phenomenon, the tooth profile of the serrations 81 (contour of the teeth in a radial cross-sectional view) formed on the inner periphery of the wheel hub 30 is controlled to fall within a specified range $L_1$ over the entire axial length of the serrations 81, as shown in FIG. 2. That is, while the tooth profile of the serrations 81 was left as it is after the swaging in the prior art irrespective of the degree of the radial contraction, the tooth profile is positively processed in this invention so that it falls within the specified range $L_1$ over the entire axial length and that no part exceeds the range $L_1$ and protrudes toward the serrated shaft 62. Deformation (or protrusion) of the serrations 81 toward the serrated shaft 92 due to the radial contraction is thereby suppressed, so that it is prevented that an excessive force is required when press-fitting the outer joint member 72 into the wheel hub 30 after the swaging, or that the press-fitting is made impossible.

The specified range $L_1$ for the tooth profile is determined by a maximum permissible force when press-fitting the outer joint member 72 into the wheel hub 30. That is, the limits of the specified range $L_1$ are defined in accordance with the maximum permissible press-fitting force in the production line, and the tooth profile of the serrations 81 is controlled to be within the thus specified range. If the maximum permissible press-fitting force in the production line is relatively large, for example, the limits are set to cover a wide range, and in a converse case, the limits are set to cover a narrow range. Taking account of the general maximum permissible press-fitting force in the production line, the specified range $L_1$ for the tooth profile should preferably be based on the dimensional tolerance of the over pin diameter, which should be within 60 μm, over the entire axial length of the serrations 81.

Figure 5:
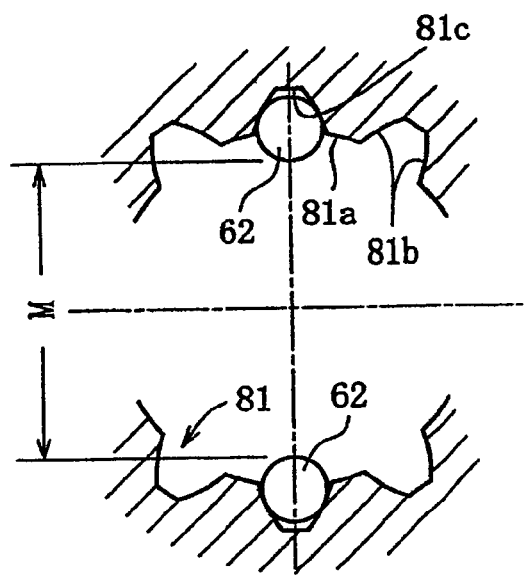
FIG. 5 is an enlarged cross-sectional view (in the radial direction) of serrations for explaining the over pin diameter.

The "over pin diameter" (O.P.D.) referred to here is a distance M between two pins 62 (or balls) when they fit in the two opposite large diameter parts (tooth space) 81c of the serrations 81, as shown in FIG. 5. The aforementioned dimensional tolerance of this distance M is used as the specified range $L_1$; the tooth profile of the serrations 81 is controlled to be within the dimensional tolerance over the entire axial length, so as to reduce the force required for press-fitting the outer joint member 72.

The tooth profile-control can be achieved by any of the following three methods, by way of example:

(1) First Example

Figure 6:
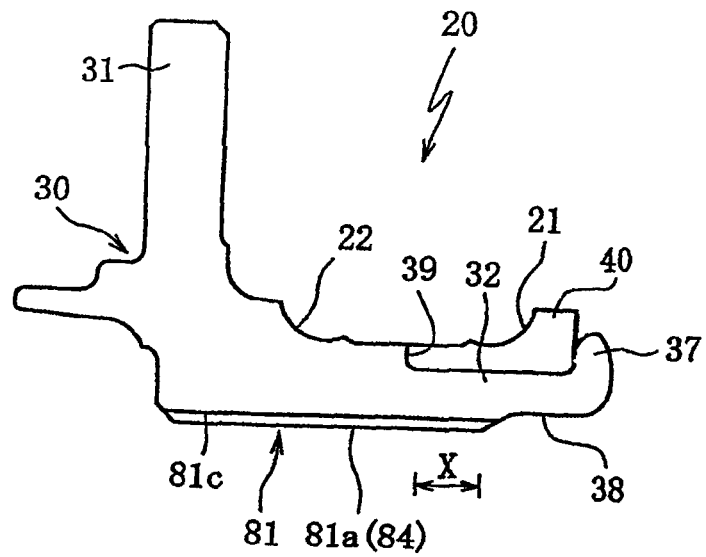
FIG. 6 is a cross-sectional view of an inner member.

See FIG. 6

The wheel hub 30 first undergoes primary turning on the inner periphery, and its inboard-side end is swaged to form the swaged portion 37. The wheel hub 30 then undergoes secondary turning (finish turning) on the inner periphery, and broaching on this secondary turned surface to form the serrations 81. The small diameter part 81a of the serrations 81 in this case will entirely be the secondary turned surface 84 over the axial length. With this process, even if the radial contraction has occurred at the inboard-side end of the serrations 81 (in the region X) due to the swaging, any protruding parts will be removed by the secondary turning afterward, whereby the tooth profile of the serrations 81 is controlled to be within the specified range over the entire axial length.

(2) Second Example

Figure 7:
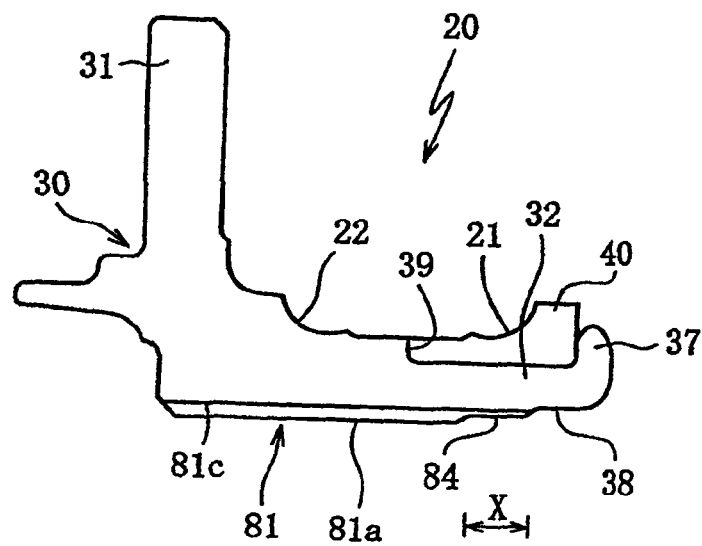
FIG. 7 is a cross-sectional view of an inner member.

See FIG. 7

Similarly to the first example, the wheel hub 30 first undergoes primary turning on the inner periphery, after which its inboard-side end is swaged to form the swaged portion 37. The wheel hub 30 then undergoes secondary turning on the inner periphery, but only in the region X where the radial contraction would most likely occur. Broaching is performed afterward to form the serrations 81. Thus, similarly to the first example, any protruding parts created by the radial contraction are removed, thereby reducing the press-fitting force that will be required, and moreover, since the secondary turning needs only be performed to a limited region, a cost reduction can be achieved as compared to the first example. The small diameter part 81a of the serrations 81 in this case has a secondary turned surface 84 only at the inboard side end, which is larger in diameter than other portions by the amount that has been removed by the secondary turning.

(3) Third Example

Figure 8:
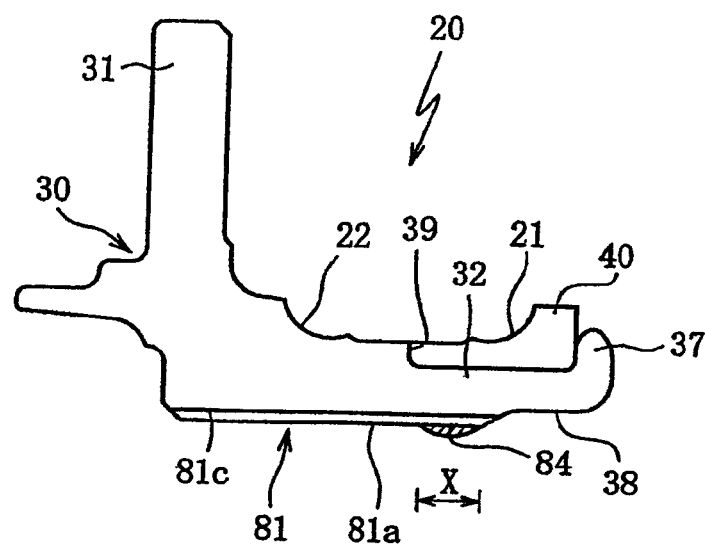
FIG. 8 is a cross-sectional view of an inner member.

See FIG. 8

The wheel hub 30 first undergoes primary turning on the inner periphery, and then broaching to form the serrations 81. The inboard-side end of the wheel hub 30 is then swaged, and the region X where the diameter has decreased is removed by secondary turning. The small diameter part 81a of the serrations 81 in this case has a secondary turned surface 84 only at the inboard-side end. While the drawing illustrates an example wherein the secondary turned surface 84 has approximately the same diameter as other portions, it may be formed larger in diameter than other portions.

In this third example, the secondary turning is performed on an area near the swaged portion 37 (the region X where the radial contraction has occurred) after the processes of the primary turning and broaching of the wheel hub 30 on the inner periphery and the swaging; the secondary turning may be substituted by secondary broaching for the removal of the part that has decreased in diameter. Alternatively, secondary turning and secondary broaching may both be carried out.

Another possible method is to restrict the radially inward deformation of the serrations 81 using a mold arranged on the inner side at the inboard-side end of the serrations 81 when swaging the end part of the wheel hub 30, whereby the tooth profile of the serrations 81 can be restricted within the predetermined specified range similarly to the above described first to third examples.

According to the invention, as described above, the swaged portion 37 includes a flat surface 38a where it abuts on the outer joint member 72 and variations in the axial position of the flat surface are controlled to be within specified limits, whereby offsetting between the joint center O and the king pin center is suppressed to a minimum, or they can be matched perfectly. Thus the driving stability of the vehicle is enhanced, and deterioration of the sealing properties in the abutting portion is prevented.

Moreover, radial contraction, or protrusion, of the torque transmitting teeth formed on the inner periphery of the first inner member at the end on the side of the swaged portion, is suppressed, whereby no excessive force is required for press-fitting the outer joint member into the first inner member after the swaging and the press-fitting operation can be carried out smoothly. Furthermore, adverse effects of the radial contraction that occurs in the wheel hub during the swaging are prevented at low cost without decreasing the effective axial length of the torque transmitting teeth.

FIG. 10 illustrates an example of a drive wheel bearing device in which the wheel hub 30 and the outer joint member 72 are fixed together in the axial direction using a retention ring 90 fitted onto the stem part 72b. The retention ring 90 is pre-fitted in an annular groove 91 formed at the distal end of the stem part 72b; it contracts in diameter when the stem part 72b is being fitted into the wheel hub 30 along its inner periphery, and returns to its shape to make resilient engagement with the wheel hub 30 at the position where the swaged portion 37 of the wheel hub 30 contacts and abuts the shoulder 72d of the outer joint member 72. The wheel hub 20 and the outer joint member 72 can thus be fixed in a detachable manner using such a retention ring 90 thanks to the self-retaining structure, whereby the weight and size reduction, a requirement for the wheel baring device, is achieved.

The mating parts of the wheel hub 30 and the outer joint member 72 may undergo rust proof treatment. This is achieved, for example, by providing an antirust (adhesive or rust proof agent) on the surface of the mating parts. More specifically, an adhesive chiefly containing synthetic rubber such as urethane rubber is preliminarily applied on the outer periphery of the stem part 72b of the outer joint member 72, after which the stem part 72b of the outer joint member 72 is fitted into the wheel hub 30. Thereby, the surface of the serrations 81 and the serrated shaft 82 is protected by the adhesive coat, and rust is prevented reliably at least in this protected part. The adhesive provided in surplus will fill the gaps in the mating parts, i.e., the gap between the serrations 81 and the serrated shaft 82, or if the adhesive is abundant, it will also fill the annular gap (pilot part 38 in FIG. 1) between the small diameter stepped part 17 (including the swaged portion 37) and the outer periphery of the stem part 72b, and the gap 92 inside the wheel hub 30 near the shaft end of the stem part 72b, so that penetration of dust or rain water through the abutting faces of the swaged portion 37 of the wheel hub 30 and the outer joint member 72, or from the opening (on the outboard side) of the wheel hub 30 is restricted, and rust is prevented in the mating parts. Moreover, the adhesive that fills the gaps in the mating parts removes the play, thereby enhancing the bearing rigidity.

According to the invention, as described above, rust prevention is achieved by the use of an antirust for the mating parts of the inner member 20 and the outer joint member 72, so that no sealing member needs to be fitted between the swaged portion 37 and the shoulder 72d of the outer joint member 72 as in the structure shown in Japanese Patent Laid-Open Publication No. 2000-14200, and yet the abutting faces make tight contact with each other. Thereby, a cost reduction is achieved by the decrease in the number of components, and the rigidity is increased because of the abutting faces making tight contact with each other.

For the antirust, a foaming agent that chiefly contains synthetic rubber such as urethane rubber may be used instead of the adhesive. Since the foaming agent expands in volume by several tens times relative to the solvent, it can fill the gaps with good efficiency, whereby even better rust proof effects are expected.

The antirust may be applied on the inner periphery of the wheel hub 30 instead of the outer periphery of the stem part 72b, or, it may be applied on both outer periphery of the stem part 72b and the inner periphery of the wheel hub 30. Further, with the wheel hub 30 and the outer joint member 72 coupled to each other, the antirust may be injected by some suitable means into the gaps 38, 92 to fill these gaps.

The bearing device of this embodiment includes a press-formed steel plate cap 93 fitted on the opening of the wheel hub 30 to prevent dust or rain water from directly adhering on the antirust. An aperture 93a is formed at the center of this cap 93. Surplus antirust can be discharged through this aperture 93a when the outer joint member 72 is fitted into the wheel hub 30, or, the antirust may be injected from outside through this aperture 93a.

FIG. 11 is a longitudinal cross-sectional view illustrating another embodiment, which differs from the embodiment shown in FIG. 10 in that an air breezer 93b made of rubber or the like is fitted into the aperture 93a formed in the cap 93, and that the retention ring 90 is engaged with the end face of the wheel hub 30. Other features are similar to those of the embodiment show in FIG. 10, the same components and parts being given the same reference numerals, and the detailed description thereof will be omitted. The addition of this air breezer 93b improves the sealing properties of the mating parts, and with the effects of the antirust, the rust proof properties are further enhanced.

Examples of the chief constituent of the adhesive or foaming agent mentioned above include the following materials:

1) Natural substances such as natural rubber, starch, glue, casein, shellac, and tar; synthetic rubbers such as synthetic isoprene rubber, butadiene rubber, styrene butadiene rubber, acrylonitrile butadiene rubber, ethylene propylene rubber, ethylene propylene dien rubber, butyl rubber, chloroprene rubber, polysulfide rubber, fluorine rubber, acrylic rubber, silicone rubber, urethane rubber, chlorosulfonate polyethylene, epichlorohydrin rubber, ethylene acrylic rubber, ethylene vinyl acetate elastomer, and phosphazene rubber;

2) Thermosetting resins such as diallyl phthalate resin, epoxy resin, melamine resin, melamine phenolic resin, phenolic resin, polyimide resin, polystyrylpyridine, urea resin, unsaturated polyester resin, silicon resin, and polyurethane;

3) Thermoplastic resins such as acrylonitrile styrene acrylate copolymer, acrylonitrile butadiene styrene copolymer, modified acrylonitrile butadiene styrene copolymer, acrylonitrile chlorinated polyethylene styrene copolymer, acrylonitrile ethylene propylene styrene copolymer, acrylonitrile resin, acrylonitrile styrene copolymer, chlorinated polyethylene, polychlorotrifluoroethylene, ethylene ethylacrylate copolymer, ethylene methacrylic copolymer, tetrafluoroethylene ethylene copolymer, ethylene vinyl acetate copolymer, ethylene vinyl acetate vinyl chloride copolymer, ethylene vinyl alcohol copolymer, tetrafluoroethylene hexafluoropropylene copolymer, ionomer resin, liquid crystal polymer (wholly aromatic polyester), maleimide styrene copolymer, methacryl styrene copolymer, polyamide, polyamide 11, polyamide 12, polyamide 46, polyamide 6, polyamide 6.66, polyamide 610, polyamide 66, modified polyamide 66, aromatic polyamide, polyaryletherketone, polyamideimide, polyarylate, polyarylsulfone, polybutyleneterephthalate, polybutene, polycarbonate, modified polycarbonate, polyethylene, high density polyethylene, medium density polyethylene, low density polyethylene, linear low density polyethylene, super high polymer polyethylene, polyetheretherketone, polyetherimide, polyetherketone, polyethersulfone, polyethyleneterephthalate, tetrafluoroethylene perfluoroalkoxyethylene copolymer, methacrylic resin, high impact methacrylic resin, modified methacrylic resin, polymethylpentene, polyacetal, polypropylene, polyphenyleneether, modified polyphenyleneether, modified polyphenylene oxide, polyphenylene sulfide, polystyrene, high impact polystyrene, medium impact polystyrene, polysulfone, modified polysulfone, polythioethersulfone, polytetrafluoroethylene, polyvinyl chloride, polyfluorovinylidene, styrene maleic acid copolymer, high impact styrene maleic acid copolymer, polystyrene elastomers, polystyrene butadiene elastomers, vinyl chloride elastomers, olefin elastomers, polyurethane elastomers, polyester elastomers, polyamide elastomers, nitrile elastomers, fluorine elastomers, and urethane vinyl chloride elastomers.

These materials may either be used alone or in combination.

As described above, the drive wheel bearing device according to the present invention incorporating the self-retaining structure includes a feature that suppresses penetration of dust or rain water into mating parts of the inner member and the outer joint member; gaps in the mating parts are filled with antirust as much as possible so as to suppress rust even if dust or water penetrates; thus the disassembling operation efficiency is much improved.

Figure 9:
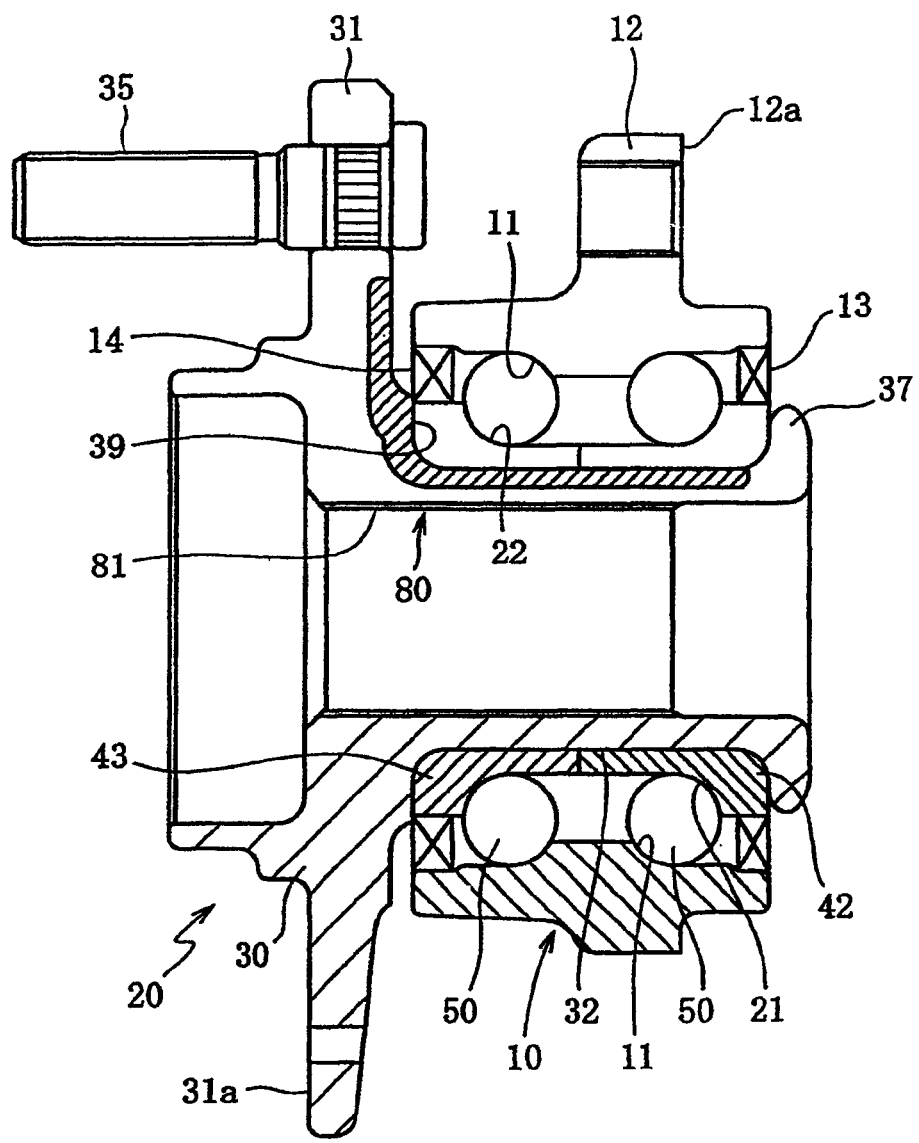
FIG. 9 is a cross-sectional view of a drive wheel bearing device according to another embodiment of the invention.

FIG. 9 illustrates another embodiment of the drive wheel bearing device. This bearing device includes a wheel hub 30 as the first inner member and two inner rings 42, 43 as the second inner members fixed onto the outer periphery of the wheel hub 30, the two inner races 21, 22 being respectively formed on the outer periphery of the inner rings 42, 43. Both inner rings 42, 43 are press-fitted onto the small diameter cylindrical part 32 on the outer side of the wheel hub 30 such as to abut each other, the inner ring 43 on the inboard side being in contact with the shoulder 39 of the flange 31 for attachment of a wheel. The inboard side end of the wheel hub 30 is plastically deformed radially outward to form the swaged portion 37, thereby uniting the inner rings 42, 43 and the wheel hub 30 and applying preload to the bearing. An outer joint member 72 is fitted into the wheel hub 30 in the state shown in FIG. 9 and fastened with a nut 61 or fixed with a retention member 90, to complete the assembly of the drive wheel bearing device (The elements that have the same or similar functions or effects as those of the bearing devices shown in FIG. 1, FIG. 10, and FIG. 11 are given the same reference numerals, and the repetitive description thereof will be omitted).

The same effects as described above will be achieved with this bearing device by employing the constructions of the invention described with reference to FIGS. 1 to 8, 10, and 11.

While the invention has been described in its preferred embodiments, it will be understood that such description is for illustrative purposes only and not of limitation, as the invention may be embodied in various other ways without departing from the spirit and the scope thereof. The scope of the invention is to be determined only by the appended claims, and should be considered to include any and all equivalent arrangements or modifications that can be made therein.

What is claimed is:

1. A drive wheel bearing device comprising: an outer member having double-row outer races on an inner periphery thereof; an inner member including double-row inner races opposite the outer races of the outer member, a first inner member, and a second inner member formed with at least one of the double-row inner races, the first inner member and the second inner member being inseparably coupled together at a flange-like swaged portion that is formed by a radially outward plastic deformation of one end of the first inner member; double-row rolling elements interposed between the outer member and the inner member; and a constant velocity joint including an outer joint member press-fitted to an inner periphery of the first inner member with torque transmission means formed therebetween that transmits torque by engagement of a plurality of axially extending teeth, wherein torque transmitting teeth of the first inner member have a tooth profile that is controlled within a specified range over the entire axial length of the teeth, wherein the specified range is determined in accordance with a maximum permissible force required for press-fitting the outer joint member, wherein the specified range is determined such that the torque transmitting teeth have an over pin diameter with a dimensional tolerance of 60 μm.

2. The drive wheel bearing device according to claim 1, wherein the tooth profile control is achieved by a process including primary turning of the first inner member on the inner periphery, swaging of one end of the first inner member, secondary turning of the first inner member on the inner periphery in a region including at least the vicinity of the swaged portion, and broaching of the inner periphery of the first inner member.

3. The drive wheel bearing device according to claim 1, wherein the tooth profile control is achieved by a process including primary turning and broaching of the first inner member on the inner periphery, swaging of one end of the first inner member, and secondary turning of the first inner member in a region including at least the vicinity of the swaged portion.

4. The drive wheel bearing device according to claim 1, wherein the torque transmitting teeth of the first inner member include a surface that has undergone secondary turning at least in the vicinity of the swaged portion.

5. The drive wheel bearing device according to claim 1, wherein at least the vicinity of the swaged portion that has undergone secondary turning has a larger diameter than other portions.

6. The drive wheel bearing device according to claim 1, wherein a negative clearance is provided between the rolling elements, and the inner races and the outer races in which the rolling elements roll.

7. The drive wheel bearing device according to claim 1, wherein a pilot part is provided at an inner periphery near the swaged portion of the first inner member.

* * * * *